US006491311B1

(12) United States Patent
Underwood et al.

(10) Patent No.: US 6,491,311 B1
(45) Date of Patent: Dec. 10, 2002

(54) PALLET LIFTING AND MOVING MECHANISM

(75) Inventors: John D. Underwood, Candler, NC (US); Randolph Scott Prause, Effingham, IL (US); David E. Raabe, Asheville, NC (US)

(73) Assignee: Southeastern Container, Inc., Enka, NC (US)

( * ) Notice: Subject to any disclaimer, the term of this patent is extended or adjusted under 35 U.S.C. 154(b) by 0 days.

(21) Appl. No.: 09/620,098

(22) Filed: Jul. 20, 2000

Related U.S. Application Data

(60) Provisional application No. 60/144,684, filed on Jul. 20, 1999.

(51) Int. Cl.[7] ................................................ B62D 21/14

(52) U.S. Cl. .................................... 280/43.12; 280/47.3

(58) Field of Search ............................ 280/43.12, 47.3, 280/78, 79.7, 47.18, 47.26

(56) References Cited

U.S. PATENT DOCUMENTS

| | | | | | |
|---|---|---|---|---|---|
| 2,439,288 | A | * | 4/1948 | Evans | 280/47.3 |
| 3,525,501 | A | * | 8/1970 | Goetz | 254/2 R |
| 3,662,989 | A | * | 5/1972 | Swinson | 254/8 R |
| 3,817,546 | A | | 6/1974 | Sugiura | |
| 3,826,512 | A | * | 7/1974 | Palmer | 280/43.12 |
| 4,168,078 | A | * | 9/1979 | Haldimann | 280/46 |
| 4,378,191 | A | * | 3/1983 | Sato | 414/540 |
| 4,417,738 | A | * | 11/1983 | Kendall | 280/43.17 |
| 4,465,413 | A | * | 8/1984 | Petren | 410/94 |
| 4,589,669 | A | | 5/1986 | Kedem | |
| 4,772,035 | A | * | 9/1988 | Danial | 280/47.3 |
| 4,997,195 | A | | 3/1991 | Lee | |
| 5,010,969 | A | * | 4/1991 | Hirmann | 180/8.1 |
| 5,246,239 | A | * | 9/1993 | Braden | 280/47.24 |
| 5,253,972 | A | | 10/1993 | Drew et al. | |
| 5,417,541 | A | | 5/1995 | Herron | |
| 5,667,230 | A | * | 9/1997 | Riley et al. | 280/79.11 |
| 5,769,595 | A | | 6/1998 | Pearce et al. | |

* cited by examiner

*Primary Examiner*—Robert P. Olszewski
*Assistant Examiner*—James S. McClellan
(74) *Attorney, Agent, or Firm*—Donald R. Fraser

(57) ABSTRACT

A pallet lifting and moving mechanism with a base, cam member, a removable handle and a wheel rotatingly secured to the cam member to lift the base from a support surface wherein the base supports a leading edge of an associated pallet to facilitate loading and supports a trailing edge of an associated pallet to facilitate unloading of the associated pallet from a delivery truck. The invention also contemplates a method of lifting the leading edge of the associated pallet during loading and the trailing edge of the associated pallet during unloading.

7 Claims, 2 Drawing Sheets

PALLET LIFTING AND MOVING MECHANISM

CROSS-REFERENCE TO RELATED APPLICATION

This application claims the benefit of U.S. provisional patent application Ser. No. 60/144,684, filed Jul. 20, 1999.

FIELD OF THE INVENTION

The invention relates to a mechanism for facilitating the loading and unloading of palleted contents to and from a delivery truck and more particularly to a mechanism capable of lifting the leading edge of an associated pallet during loading and the trailing edge during unloading, thereby minimizing the potential for the mechanism to contact an obstacle on the vehicle floor during the loading and unloading operations. The invention also relates to a method of lifting the leading edge of the associated pallet to facilitate loading and unloading thereof.

BACKGROUND OF THE INVENTION

It is generally well known in the field of freight handling to place loads of material on pallets and employ a mechanism such as a forklift truck apparatus or a pallet jack, for example, to raise the palleted contents to facilitate the loading and unloading operations.

Typically, the pallet jack includes narrow tines or forks which are employed for lifting the loaded pallets. A handle which operates an associated pump is typically employed to raise the tines or forks. The handle is repeatedly moved in an arcuate up and down manner to raise the tines or forks to a desired height. The forklift truck requires the use of an associated motor to raise the tines or forks to the desired height.

Since mechanisms such as the pallet jack and the forklift truck are heavy, bulky, expensive, and in certain situations require separate operators, it is desirable to have an easily operated mechanism which is economical to produce.

An object of the present invention is to produce a pallet lifting and moving mechanism capable of only slightly lifting or raising one end of the palleted contents to facilitate the movement thereof.

Another object of the present invention is to produce a pallet lifting and moving mechanism which is simple and economical to manufacture.

Another object of the present invention is to produce a pallet lifting and moving mechanism which is easy to use.

Yet another object of the present invention is to produce a pallet lifting and moving mechanism which facilitates the safe movement of palleted contents from one position to another.

Still another object of the present invention is to produce a pallet lifting and moving mechanism which is lightweight and requires a minimal amount of space for operation.

SUMMARY OF THE INVENTION

The above, as well as other objects of the invention, may be readily achieved by a pallet lifting and moving mechanism comprising: a base including a supporting surface engaging portion; a cam member pivotally secured to the base; wheel means operatively mounted to the cam member; and a handle secured to the cam member for pivotally moving the cam member to elevate the base.

The invention also contemplates a method of lifting an edge of an associated pallet during transport of the pallet on a support surface using a pallet lifting and moving mechanism having a base with a support surface engaging portion and a lip portion extending outwardly therefrom, a cam member pivotally secured to the base, wheel means rotatingly secured to the cam member, and a handle detachably secured to the cam member, the method comprising: placing the lip portion under the edge of the pallet; causing the cam member to be cammed downwardly using the handle to cause the cam member to contact the support surface thereby raising the pallet lifting and moving mechanism with respect to the supporting surface and similarly raising the pallet edge with respect to the support surface; further causing the cam member to be cammed downwardly using the handle to cause the wheel to contact the support surface; moving the pallet into a desired position on the support surface; causing the cam member to be cammed upwardly using the handle to cause the wheel to lose contact with the support surface; causing the cam member to be further cammed upwardly to cause the cam surface to lose contact with the support surface; and removing the lip portion from under the edge of the pallet.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE PREFERRED EMBODIMENT

Figure 1:
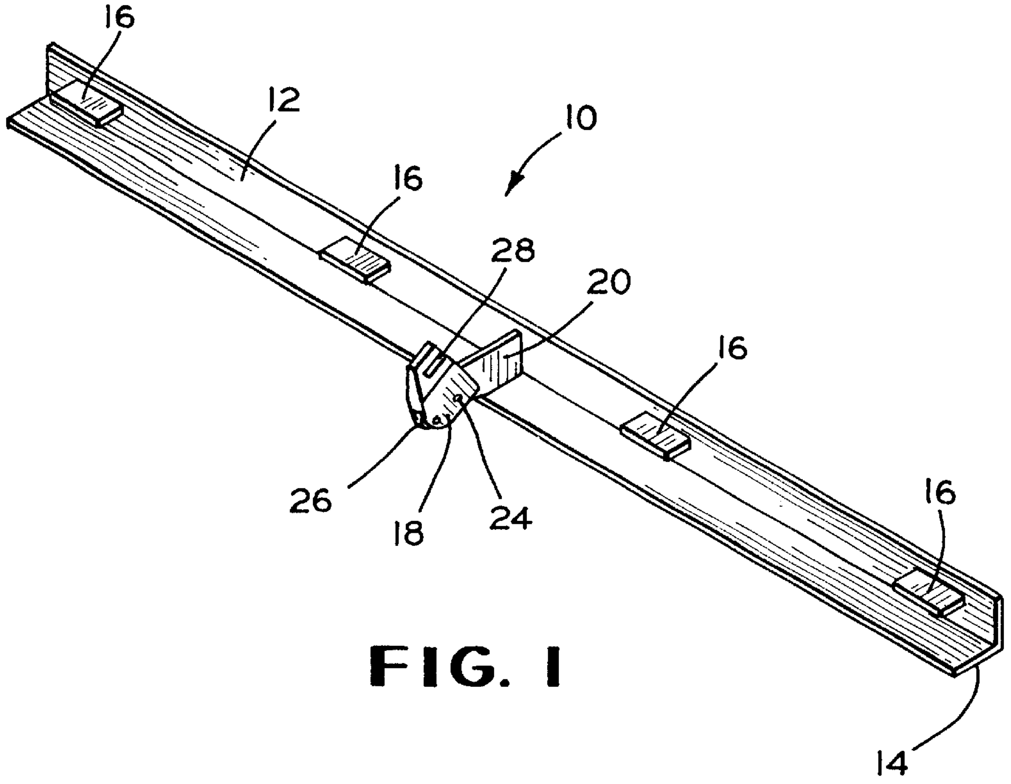
FIG. 1 is a perspective view of a pallet lifting and moving mechanism incorporating the features of the invention.

Referring now to the drawings, and particularly FIG. 1, there is shown generally at 10 a pallet lifting and moving mechanism incorporating the features of the invention. The pallet lifting and moving mechanism 10 is generally L-shaped in cross-section and includes an upstanding portion 12 and a coextensive support surface engaging portion 14. The support surface engaging portion 14 extends outwardly from the upstanding portion 12. The support surface engaging portion 14 typically has a substantially flat bottom surface. In the embodiment shown, both the support surface engaging portion 14 and the upstanding portion 12 extend the full length of the pallet lifting and moving mechanism 10. A plurality of spaced apart lip portions 16 extend outwardly from the upstanding portion 12. The lip portions 16 are spaced apart from and extend substantially parallel to the support surface engaging portion 14. The lip portion 16 is configured to engage an edge of a pallet (not shown). In the illustrated embodiment of the invention, four spaced apart lip portions 16 are shown.

A cam member 18 is pivotally attached to a bracket 20 which extends outwardly from the upstanding portion 12. The cam member 18 is secured to the upstanding portion 12 by any conventional fastening means such as, for example, welding. The cam member 18 is provided with a cam surface 22, as clearly illustrated in FIG. 2. The cam surface 22 is spaced a sufficient distance from a pivot 24 to cause the upstanding portion 12 and the support surface engaging portion 14 to rise from the support surface when the cam member 18 is pivoted. In the stored position, the cam member 18 is pivoted upwardly away from the supporting surface so the cam surface 22 is free from contact with the support surface.

Figure 2:
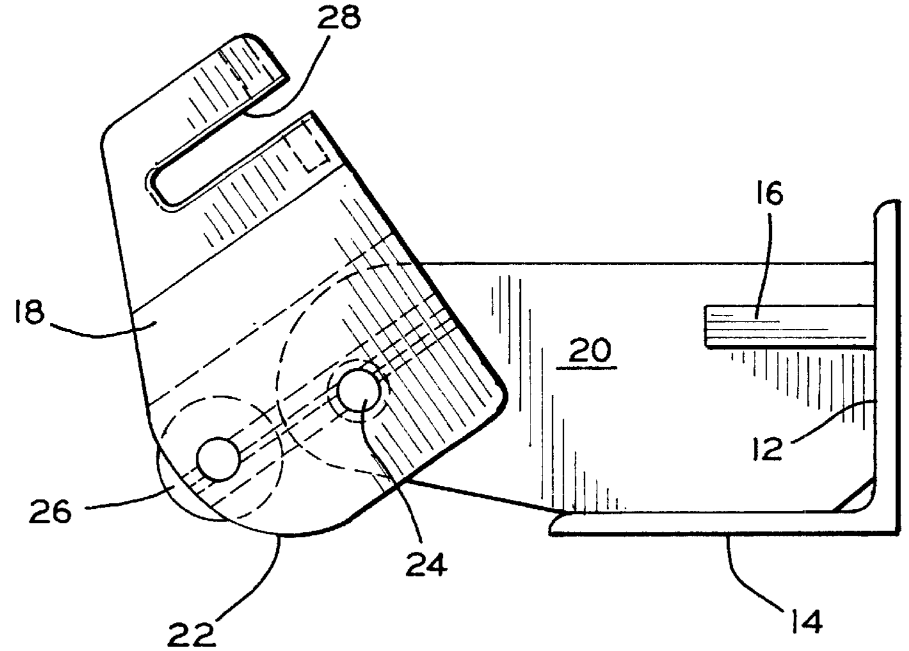
FIG. 2 is a right side elevational view of the pallet lifting mechanism illustrated in FIG. 1.

A wheel 26 is rotatably mounted on the cam member 18. While a conventional wheel mechanism is suitable for use, as is illustrated in FIG. 2, it will be understood that a ball-type rolling support member or other wheel or roller member could also be satisfactorily employed.

In the illustrated embodiment, the cam member 18 is provided with a slot 28 for receiving an operating rod or handle (not shown). Alternatively, an aperture or pin for receiving the handle may be provided.

Figure 3:
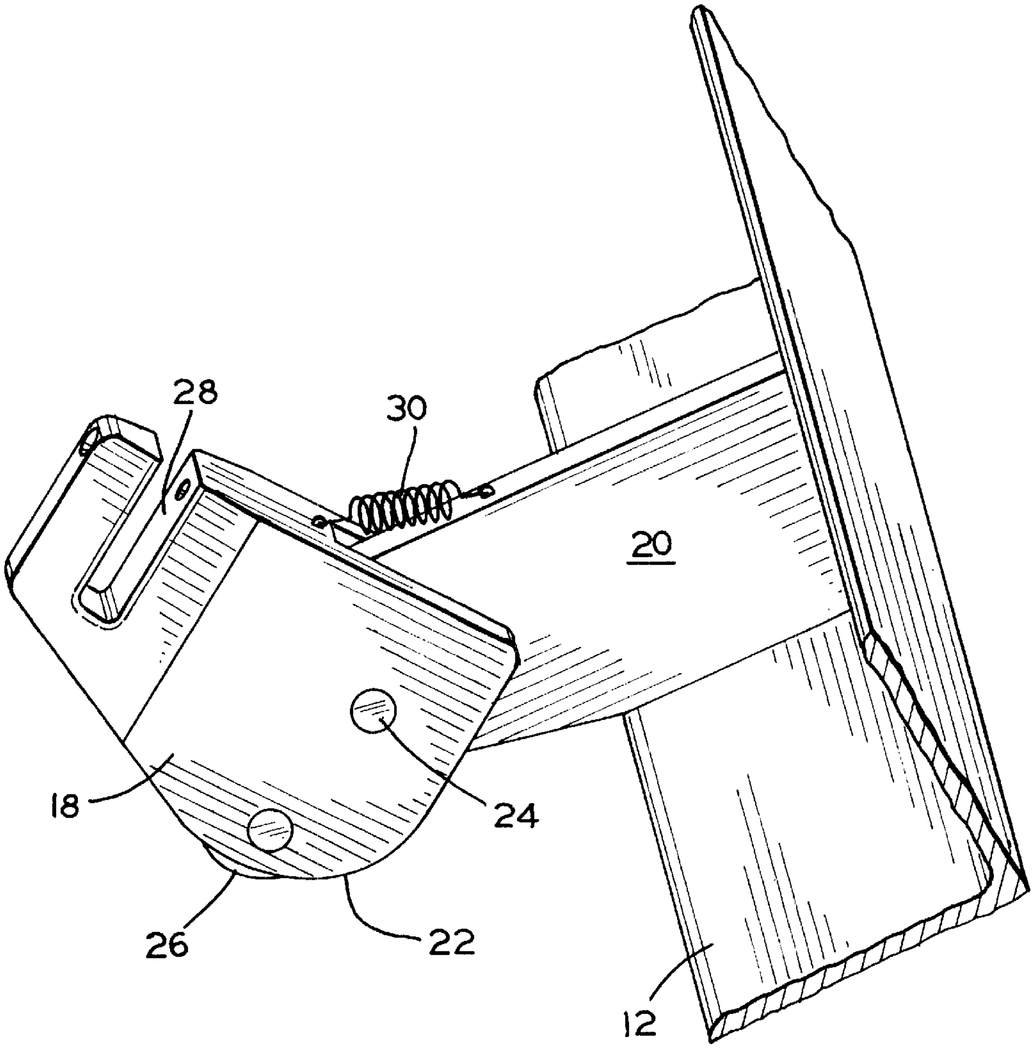
FIG. 3 is a fragmentary perspective view showing the same mechanism as illustrated in FIG. 2 with the addition of a spring coupled between the cam member and the associated support.

A helical spring 30 is employed to normally urge the cam member 18 pivotally upwardly into the stored or inoperative position. The spring 30 is connected between the cam member 18 and the bracket 20, as clearly illustrated in FIG. 3. Alternatively, the helical spring 30 may be connected between the cam member 18 and the upstanding portion 12.

In operation, during the loading process, the pallet lifting and moving mechanism 10 is disposed in such a manner that the lip portion 16 attached to and extending outwardly from the upstanding portion 12 is positioned under the leading edge of an associated pallet to facilitate the movement thereof. During the unloading process, the pallet lifting and moving mechanism 10 is disposed to position the lip portion 16 under the trailing edge of an associated pallet. The operator then causes the cam member 18 to be cammed downwardly by moving the operating handle downwardly. As the camming surface 22 of the cam member 18 is caused to contact the support surface, the upstanding portion 12 and the support surface engaging portion 14 are initially elevated to a first position effecting a similar upward movement of the contacted edge of the pallet. By further pivotal movement of the cam member 18, the wheel 26 is caused to contact the support surface thereby elevating the upstanding portion 12 and the support surface engaging portion 14 to a second position and facilitating the loading or unloading operation. The operator can then manipulate the pallet into a desired position in a truck or in a warehouse, for example.

Additional cam members 18 and brackets 20 may be added to the L-shaped base 12 to adapt the pallet lifting and moving mechanism 10 for use with pallets having varying configurations. For example, for pallets having a center support, two cam members 18 and brackets 20 can be disposed on opposing sides of an opening in the L-shaped base 12 which receives the center support in the pallet. A single handle or dual handles can be used with this configuration.

From the foregoing description, one ordinarily skilled in the art can easily ascertain the essential characteristics of this invention and, without departing from the spirit and scope thereof, can make various changes and modifications to the invention to adapt it to various usages and conditions in accordance with the scope of the appended claims.

What is claimed is:

1. A pallet lifting and moving mechanism comprising:

a base including a pallet edge engaging portion and a supporting surface engaging portion, the supporting surface engaging portion having two spaced apart parallel edges; and a cam member pivotally secured to said base for pivotal movement about a first axis, said cam member including a cam surface for selective contact with a supporting surface and wheel means mounted to said cam member for rotatable movement about a second axis parallel with and spaced from the first axis, the cam surface disposed between the first and second axes of said cam member, whereby when said cam member is pivotally moved about the first axis the cam surface of said cam member is caused to engage the supporting surface and simultaneously one edge of the supporting surface engaging portion of the pallet edge engaging portion is lifted and the wheel means is thence caused to move into engagement with the supporting surface to further lift the one edge of the supporting surface engaging portion to thereby facilitate the sliding movement of said base.

2. The pallet lifting and moving mechanism according to claim 1, wherein said wheel means includes an axle mounted wheel.

3. The pallet lifting and moving mechanism according to claim 1, including a slot formed in said cam member for receiving a handle.

4. The pallet lifting and moving mechanism according to claim 1, including a spring disposed between said cam member and said base for urging said cam member toward said base.

5. The pallet lifting and moving mechanism according to claim 1, wherein said base is substantially L-shaped including an upstanding portion and a support surface engaging portion.

6. The pallet lifting and moving mechanism according to claim 5, including a bracket extending outwardly from the upstanding portion of said base and said cam member is pivotally secured to said bracket.

7. The pallet lifting and moving mechanism according to claim 6, including a spring disposed between said cam member and said bracket.

* * * * *